(12) United States Patent  
Kuzuyama et al.

(10) Patent No.: US 6,932,062 B2  
(45) Date of Patent: Aug. 23, 2005

(54) COMPRESSION IGNITION TYPE INTERNAL COMBUSTION ENGINE

(75) Inventors: Hiroshi Kuzuyama, Aichi-ken (JP); Kenji Kawai, Aichi-ken (JP)

(73) Assignee: Kabushiki Kaisha Toyota Jidoshokki, Kariya (JP)

(*) Notice: Subject to any disclaimer, the term of this patent is extended or adjusted under 35 U.S.C. 154(b) by 0 days.

(21) Appl. No.: 10/925,068

(22) Filed: Aug. 24, 2004

(65) Prior Publication Data
US 2005/0098148 A1 May 12, 2005

(30) Foreign Application Priority Data
Nov. 7, 2003 (JP) ............................. 2003-378926

(51) Int. Cl.$^7$ ............................................ F02B 47/08
(52) U.S. Cl. ............................ 123/568.13; 123/568.14
(58) Field of Search ................... 123/568.14, 568.13, 123/568.15, 90.15, 90.17, 90.18, 90.26

(56) References Cited

U.S. PATENT DOCUMENTS 4,732,116 A * 3/1988 Tanahashi et al. ...... 123/65 BA
5,983,872 A * 11/1999 Ito et al. ................. 123/568.14

FOREIGN PATENT DOCUMENTS

| JP | 64-032059 | 2/1989 | .......... F02M 25/06 |
| JP | 10-018907 | 1/1998 | .......... F02F 1/38 |
| JP | 11-229974 | 8/1999 | .......... F02M 25/07 |
| JP | 2000-199440 | 7/2000 | .......... F02D 13/02 |
| JP | 2001-349219 | 12/2001 | .......... F02B 11/00 |

* cited by examiner

Primary Examiner—Mahmoud Gimie
(74) Attorney, Agent, or Firm—Morgan & Finnegan, LLP (57) ABSTRACT

A compression ignition internal combustion engine according to the present invention includes: at least one combustion chamber; an intake passage and an exhaust passage connected to the combustion chamber, respectively; intake valve provided at a position along the intake passage, for opening and closing the intake passage; exhaust valve provided at a position along the exhaust passage, and is driven by a cam, for opening and closing the exhaust passage, the exhaust valve opening the exhaust passage for a period of at least a portion of an exhaust stroke, and for a period of at least a portion of an intake stroke, during compression ignition combustion mode and during spark ignition combustion mode; and an exhaust throttle provided at a position along the exhaust passage, for opening and closing the exhaust passage, the exhaust throttle recirculating exhaust gas to the combustion chamber by opening the exhaust passage at least during the intake stroke during compression ignition combustion mode, the exhaust throttle preventing the recirculation of the exhaust gas to the combustion chamber by closing the exhaust passage for a period at least when the exhaust valve is open in the intake stroke during spark ignition combustion mode.

14 Claims, 7 Drawing Sheets

FIG. 10

COMPRESSION IGNITION TYPE INTERNAL COMBUSTION ENGINE

BACKGROUND OF THE INVENTION

1. Field of the Invention

The present invention relates to a compression ignition type internal combustion engine. In particular, the present invention relates to a compression ignition type internal combustion engine that switches between spark ignition combustion mode and compression ignition combustion mode.

2. Description of the Related Art

Figure 10:
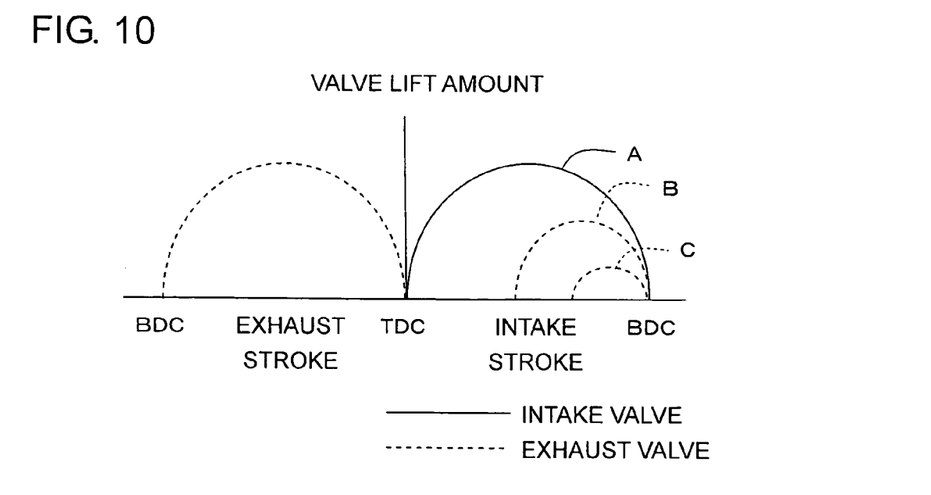
FIG. 10 is a diagram that shows opening and closing operations of a valve in a conventional compression ignition engine.

Existing compression ignition engines perform compression ignition combustion mode in a region of low load and intermediate load, and perform spark ignition combustion mode in a region of high load. Referring to FIG. 10, an intake valve opens at a timing, and by a lift amount, denoted by reference symbol A, and an exhaust valve opens at a timing, and by a lift amount, denoted by reference symbol B or C during an intake stroke with this type of engine. A high temperature exhaust gas that is exhausted from the exhaust valve to an exhaust passage during an exhaust stroke recirculates to a combustion chamber, performing internal exhaust gas recirculation (EGR). As a result, inner portions of the combustion chamber are heated and compression ignition occurs. Further, there is a danger that knocking will be promoted during spark ignition combustion mode if a high temperature exhaust gas is used. It is thus preferable to keep the exhaust valve closed during the intake stroke. In JP 2001-349219 A, for example, exhaust valve control corresponding to an intake stroke during compression ignition combustion mode and corresponding to an intake stroke during spark ignition combustion mode is performed by utilizing an electromagnetic valve driver apparatus.

However, the electromagnetic valve driver apparatus described above is extremely high cost. Accordingly, there is a problem in that the final cost of the overall engine also becomes expensive. Further, complex control is necessary in order to open and close the exhaust valve corresponding to both compression ignition combustion mode and spark ignition combustion mode by using the electromagnetic valve driver apparatus. In addition, many existing engines perform valve control by using a cam. It is thus preferable to use the existing cam structure engines, without reconstructing the existing engines to incorporate the electromagnetic valve driver apparatus.

SUMMARY OF THE INVENTION

The present invention has been made in order to solve problems like those described above. An object of the present invention is to provide a compression ignition internal combustion engine in which inner portion EGR can be performed in a cam structure engine only during compression ignition combustion mode by using simple control while keeping costs low.

A compression ignition internal combustion engine according to the present invention performs switching between compression ignition combustion mode and spark ignition combustion mode. The compression ignition internal combustion engine includes: at least one combustion chamber; an intake passage and an exhaust passage connected to the combustion chamber, respectively; intake means provided at a position along the intake passage, for opening and closing the intake passage; exhaust means provided at a position along the exhaust passage, and is driven by a cam, for opening and closing the exhaust passage. The exhaust means opens the exhaust passage for a period of at least a portion of an exhaust stroke, and for a period of at least a portion of an intake stroke, during compression ignition combustion mode and during spark ignition combustion mode. Also, the compression ignition internal combustion engine includes: exhaust gas recirculation preventing means provided at a position along the exhaust passage, for opening and closing the exhaust passage. The exhaust gas recirculation preventing means recirculates exhaust gas to the combustion chamber by opening the exhaust passage at least during the intake stroke during compression ignition combustion mode, and the exhaust gas recirculation preventing means prevents the recirculation of the exhaust gas to the combustion chamber by closing the exhaust passage for a period at least when the exhaust means is open in the intake stroke during spark ignition combustion mode.

DETAILED DESCRIPTION OF THE PREFERRED EMBODIMENTS

Embodiments of the present invention are explained below based on the appended drawings.

Embodiment 1

Figure 1:
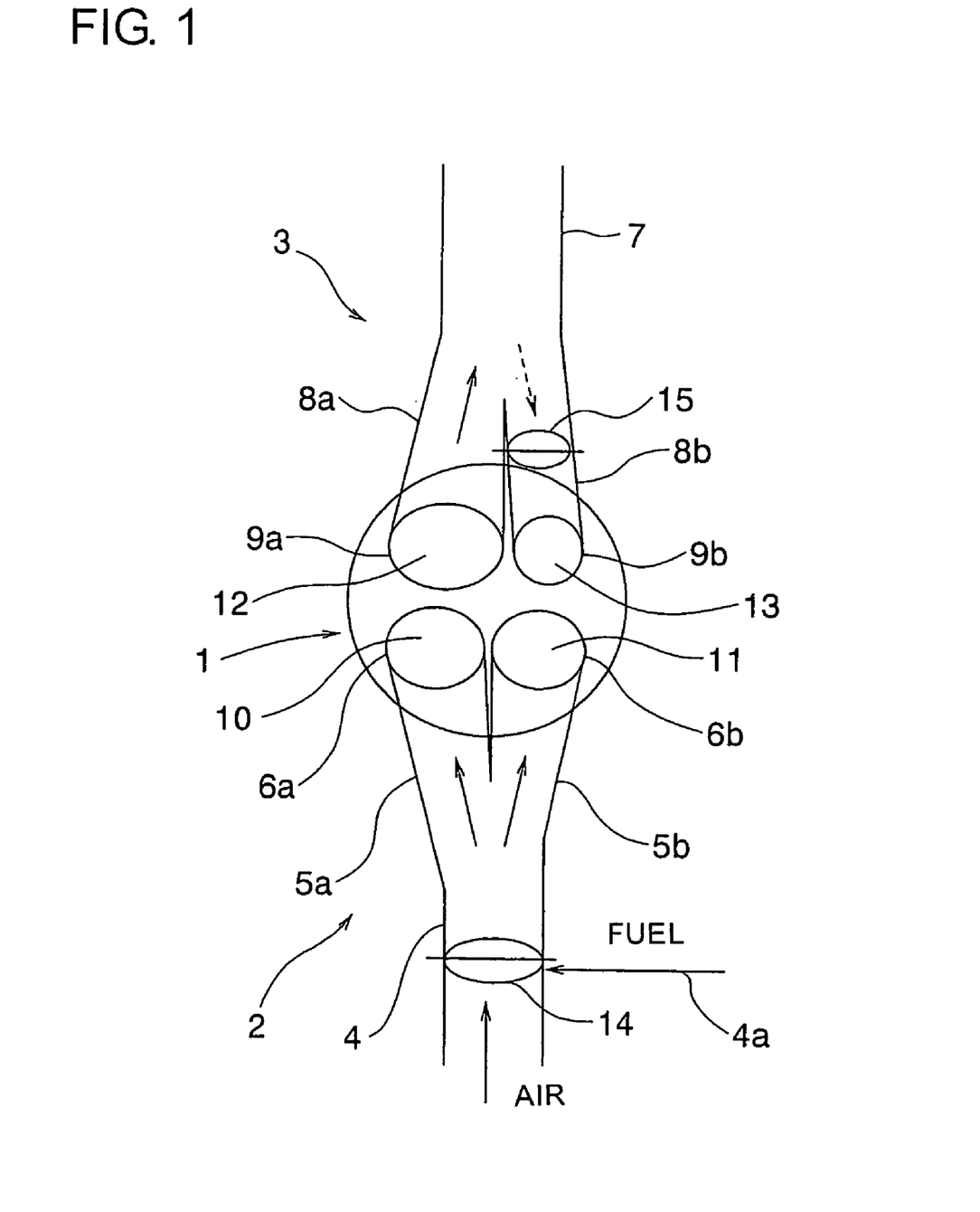
FIG. 1 is a plan view that schematically shows the vicinity of a combustion chamber of a compression ignition engine according to Embodiment 1 of the present invention.

FIG. 1 schematically shows, as a compression ignition combustion engine according to Embodiment 1, the vicinity of one combustion chamber of a compression ignition engine that is used in a gas engine heat pump (GHP), or the like. An intake passage 2 and an exhaust passage 3 are connected to an engine combustion chamber 1. The intake passage 2 comprises an intake merging passage 4 and two intake branch passages 5a and 5b that branch at a distal end of the intake merging passage 4. The two intake branch passages 5a and 5b are linked to the combustion chamber 1 through two intake openings 6a and 6b, respectively, which have substantially the same diameter. Further, a fuel supply passage 4a is linked to the intake merging passage 4. A gas that is used as fuel is supplied to the intake passage 2 through the fuel supply passage 4a. Compression ignition combustion thus occurs within the combustion chamber 1, after the fuel and air are mixed in advance before flowing into the combustion chamber 1. That is, premixed compression ignition combustion mode is performed. On the other hand, the exhaust passage 3 comprises an exhaust merging passage 7, and a first exhaust branch passage 8a and a second exhaust branch passage 8b that branch at a distal end of the exhaust merging passage 7. The first exhaust branch passage 8a and the second exhaust branch passage 8b are linked to the combustion chamber 1 through a first exhaust opening 9a and a second exhaust opening 9b, respectively, that have mutually different diameters. Referring to FIG. 1, the diameter of the second exhaust opening 9b is set smaller than the diameter of the first exhaust opening 9a.

Further, intake valves 10 and 11 are disposed in the two intake openings 6a and 6b, respectively, as intake means. The two intake valves 10 and 11 are driven to open and close through an intake valve cam (not shown). On the other hand, a first exhaust valve 12 and a second exhaust valve 13 are disposed in the first exhaust opening 9a and in the second exhaust opening 9b, respectively, as exhausting means. The first exhaust valve 12 and the second exhaust valve 13 are driven to open and close through an intake valve cam (not shown). In addition, an intake throttle 14 serving as an intake control means that reduces the effective cross sectional area of the intake merging passage 4, thus restricting new gas inflow to the combustion chamber 1, is attached to an intermediate location of the intake merging passage 4. Further, an exhaust throttle 15 that opens and closes the second exhaust branch passage 8b is attached as an exhaust gas recirculation preventing means to an intermediate location of the second exhaust branch passage 8b that is connected to the second exhaust opening 9b. In this embodiment, the exhaust throttle 15 is normally closed during spark ignition combustion mode, and is normally open during compression ignition combustion mode. It should be noted that a spark plug (not shown) for spark ignition combustion mode is disposed within the combustion chamber 1.

Figure 2:
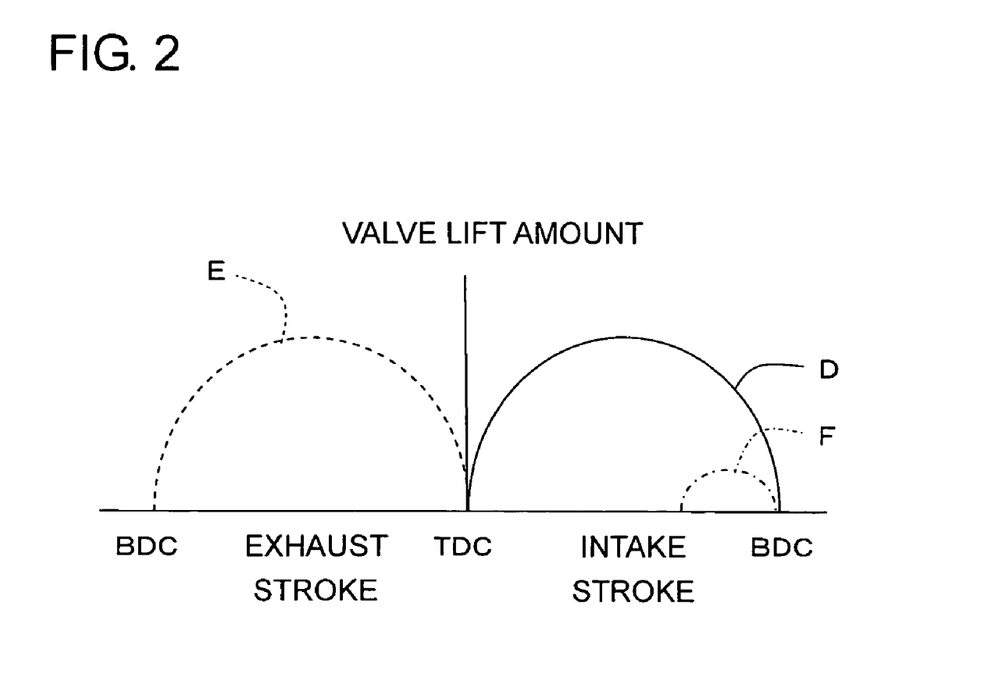
FIG. 2 is a diagram that shows valve opening and closing operations in Embodiment 1.

Referring to FIG. 2, opening and closing control of the intake valves 10 and 11, the first exhaust valve 12, and the second exhaust valve 13 during an intake stroke and an exhaust stroke is explained. Opening and closing operations of each of the valves 10 to 13 are fixed, regardless of whether compression ignition combustion mode or spark ignition combustion mode is being performed. As shown in FIG. 2, the first exhaust valve 12 opens at a timing, and by a lift amount, denoted by reference symbol E during the exhaust stroke. Further, the two intake valves 10 and 11 both open at a timing, and by a lift amount, denoted by reference symbol D during the intake stroke. In addition, the second exhaust valve 13 opens at a timing, and by a lift amount, denoted by reference symbol F during the latter half of the intake stroke. That is, the first exhaust valve 12 only opens during the exhaust stroke, and the second exhaust valve 13 only opens during the latter half of the intake stroke.

It should be noted that reference symbol TDC in FIG. 2 denotes top dead center, and that reference symbol BDC in FIG. 2 denotes bottom dead center.

Operations of the compression ignition engine according to Embodiment 1 are explained next. The engine is driven by switching between compression ignition combustion mode and spark ignition combustion mode. That is, compression ignition combustion mode is performed in a low load region and in an intermediate load region, while spark ignition combustion mode is performed in a high load region.

Operations during compression ignition are explained first. The exhaust throttle 15 that is attached at an intermediate location of the second exhaust branch passage 8b is opened during the exhaust stroke during compression ignition combustion mode. Further, the exhaust throttle 15 and the intake throttle 14 are both opened during the intake stroke.

The first exhaust valve 12 opens at the timing, and by the lift amount, denoted by reference symbol E during the exhaust stroke, and the second exhaust valve 13 closes. High temperature exhaust gas generated within the combustion chamber 1 is thus exhausted to the exhaust merging passage 7, through only the first exhaust branch passage 8a. On the other hand, when the two intake valves 10 and 11 both open at the time, and by the lift amount, denoted by reference symbol D in the intake stroke with the intake throttle 14 in an open state, a mixture of air and fuel is renewed and flows as a new gas into the inside of the combustion chamber 1 through the intake branch passages 5a and 5b. In addition, although the exhaust throttle 15 is open during the intake stroke, the second exhaust valve 13 opens during the latter half of the intake stroke at the timing, and by the lift amount, denoted by reference symbol F. Accordingly, the high temperature exhaust gas that is exhausted to the exhaust passage 3 during the exhaust stroke recirculates into the combustion chamber 1 through the second exhaust branch passage 8b, as shown by a dotted line in FIG. 1. The high temperature exhaust gas then heats the air-fuel mixture within the combustion chamber 1, and compression ignition occurs in this state. Compression ignition combustion mode can thus be performed at high efficiency with natural gas or the like having low ignitability used as fuel. It should be noted that the exhaust throttle 15 is opened during a compression stroke and an expansion stroke, in addition to the exhaust stroke and the intake stroke. That is, the exhaust throttle 15 is always open through all strokes during compression ignition combustion mode.

It is preferable here that the opening of the intake throttle 14 be made small, making the intake merging passage 4 narrow, during the intake stroke as described above. The amount of the new gas flowing into the combustion chamber 1 is thus restricted. The amount of recirculation of the exhaust gas can be increased, and the air-fuel mixture within the combustion chamber 1 can be heated efficiently, if the intake throttle 14 restricts the inflow of the new gas. Further, the inside of the combustion chamber 1 is under a negative pressure in the state where the new gas flows into the combustion chamber 1 until the second exhaust valve 13 opens in the latter half of the intake stroke. Accordingly, the high temperature gas flows into the combustion chamber 1 all at once when the second exhaust valve 13 is opened. As a result, there is an added temperature increase effect due to adiabatic compression, and the air-fuel mixture within the combustion chamber 1 can be heated with additional efficiency.

Operations during spark ignition combustion mode are explained next. The exhaust throttle 15 is always closed during spark ignition combustion mode, and the intake throttle 14 is opened by a suitable amount during the intake stroke. When the first exhaust valve 12 opens at the timing, and by the lift amount, denoted by reference symbol E during the exhaust stroke, high temperature exhaust gas generated within the combustion chamber 1 is exhausted to the exhaust merging passage 7 through the first exhaust branch passage 8a, similar to the exhaust stroke during compression ignition combustion mode. Further, when the two intake valves 10 and 11 both open at the timing, and by the lift amount, denoted by reference symbol D with the intake throttle 14 in an open state also during the intake stroke, an air-fuel mixture is introduced within the combustion chamber 1 as a new gas from the two intake openings 6a and 6b, through the intake branch passages 5a and 5b.

The cam sets the opening and closing timing for the second exhaust valve 13. Accordingly, the second exhaust valve 13 also opens at the timing, and by the lift amount, denoted by reference symbol F in the latter half of the intake stroke during spark ignition combustion mode, similar to compression ignition combustion mode discussed above. However, in this embodiment the exhaust throttle 15 is closed during the intake stroke during spark ignition combustion mode. Accordingly, the second exhaust branch passage 8b is cutoff by the exhaust throttle 15 even if the second exhaust valve 13 is open. The high temperature exhaust gas that is exhausted from the first exhaust opening 9a to the exhaust merging passage 7 in the exhaust stroke during spark ignition combustion mode is therefore prevented from recirculating into the combustion chamber 1 through the second exhaustion branch passage 8b. The air-fuel mixture that flows into the combustion chamber 1 from the two intake openings 6a and 6b as described above is thus sufficiently compressed. In addition, the air-fuel mixture is ignited by a spark plug (not shown), thus performing spark ignition combustion mode. Spark ignition combustion mode can thus be performed in a state where the exhaust gas does not recirculate within the combustion chamber 1. Accordingly, the promotion of knocking by the high temperature exhaust gas is prevented, and it thus becomes possible to perform stable spark ignition combustion mode.

As described above, by driving the intake valves 10 and 11, the first exhaust valve 12, and the second exhaust valve 13 by fixed opening and closing operations, during both compression ignition combustion mode and spark ignition combustion mode through use of a cam, and by closing the exhaust throttle 15 only during spark ignition combustion mode, control can be easily performed so that the high temperature exhaust gas recirculates into the combustion chamber during compression ignition combustion mode, and the exhaust gas does not recirculate during spark ignition combustion mode.

Further, driving valves to open and close through use of a cam is often used in existing engines. Accordingly, existing cam engines can be used without a great deal of structural improvements.

In addition, the compression ignition engine of the present invention does not use an extremely high cost electromagnetic valve drive apparatus like that used conventionally. Accordingly, the cost of the overall engine can be suppressed.

It should be noted that, although the exhaust throttle 15 is always closed during spark ignition combustion mode in Embodiment 1 as described above, as a substitute, the exhaust throttle 15 may also be closed only during the intake stroke during spark ignition combustion mode. Alternatively, the exhaust throttle 15 may be closed for at least a period during which the second exhaust valve 13 is open, that is, during a period shown by reference symbol F in FIG. 2.

Figure 3A:
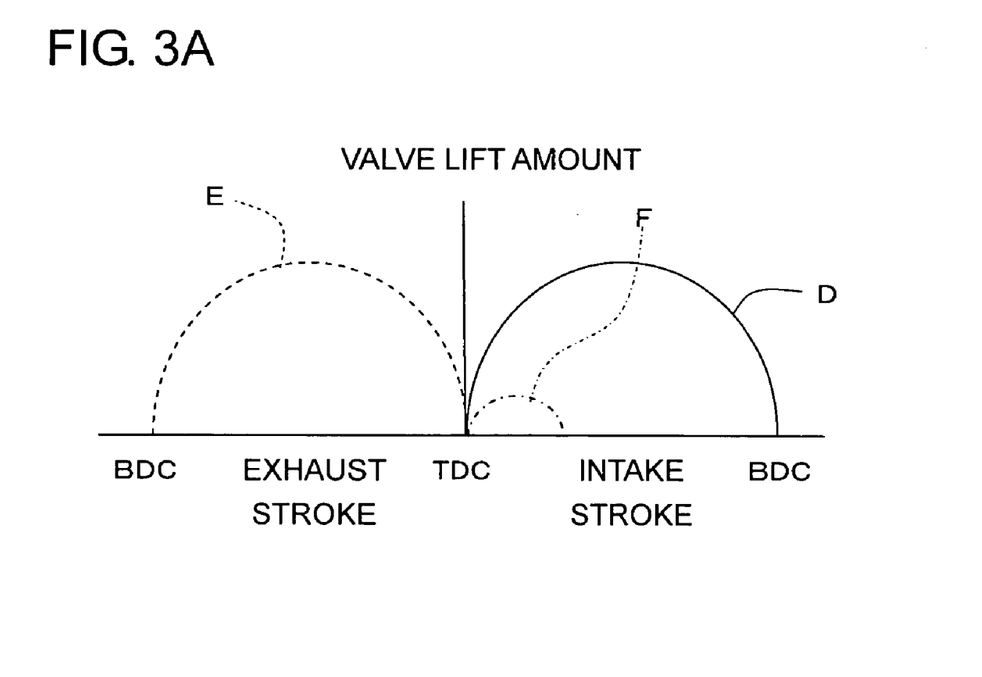
FIGS. 3A and 3B are diagrams that each show valve opening and closing operations in Embodiment 1.
Figure 3B:
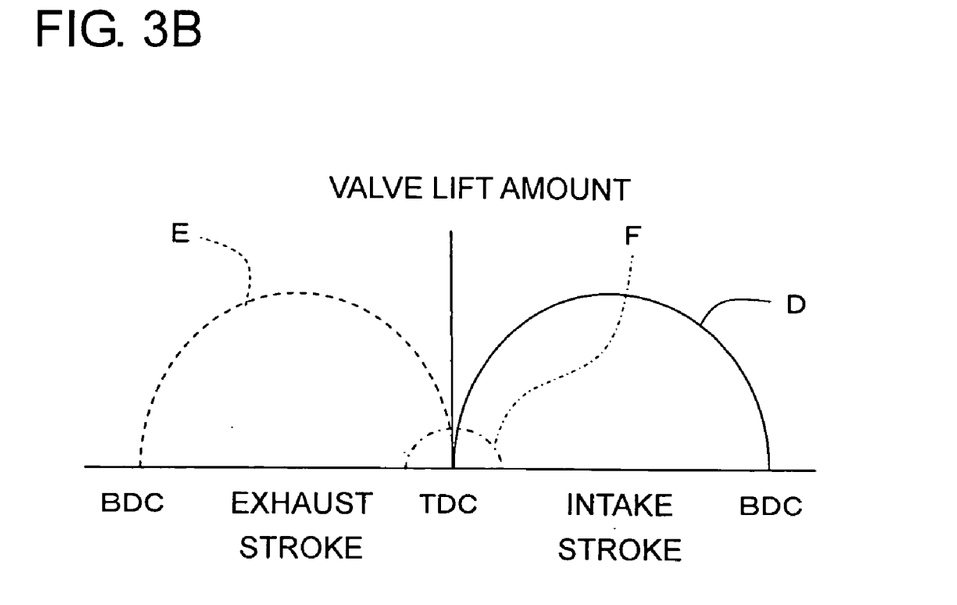

Further, as a substitute for the second exhaust valve 13 opening in the latter half of the intake stroke at the timing, and by the lift amount, denoted by reference symbol F, the second exhaust valve 13 may be also open during the first half of the intake stroke as shown in FIG. 3A. The second exhaust valve 13 may be also open as shown in FIG. 3B, straddling the exhaust stroke and the intake stroke. The second exhaust valve 13 may be opened at any timing and by any lift amount, provided that at minimum there is a period in which the second exhaust valve 13 is open during the intake stroke. It should be noted that, the second exhaust valve 13 also contributes to exhaust during the exhaust stroke, not only the first exhaust valve 12, for cases where the second exhaust valve 13 is open for a period that straddles the exhaust stroke and the intake stroke as described above. Accordingly, exhaust of the exhaust gas can be performed with good efficiency.

In addition, although the second exhaust opening 9b has a smaller diameter than the first exhaust opening 9a in Embodiment 1 described above, as a substitute, the first exhaust opening 9a and the second exhaust opening 9b may also both have substantially the same diameter.

Embodiment 2

Figure 4A:
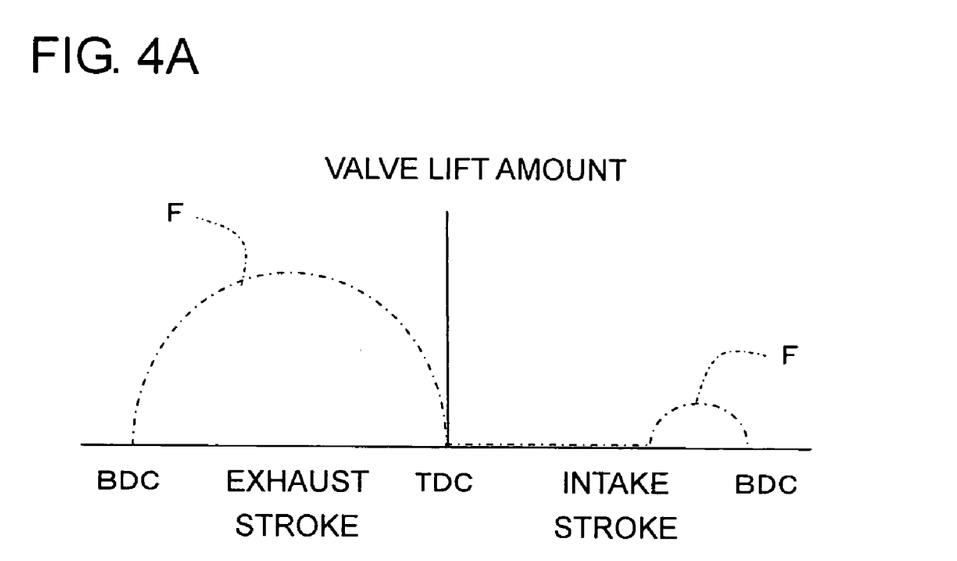
FIG. 4A is a diagram that shows valve opening and closing operations in Embodiment 2.

Embodiment 2 of the present invention is explained next. A compression ignition engine of Embodiment 2 is one in which the second exhaust valve 13 is opened similarly to the first exhaust valve 12 during the exhaust stroke, in addition to the latter half of the intake stroke, in the compression ignition engine of Embodiment 1 shown in FIG. 1. That is, referring to FIG. 4A, the first exhaust valve 12 and the second exhaust valve 13 both open at the timing, and by the lift amount, denoted by reference symbol F during exhaust stroke. Only the second exhaust valve 13 is opened during the intake stroke. These opening and closing operations for the second exhaust valve 13 are achieved by using a two stage cam having two projections as a cam for the second exhaust valve 13. Further, in Embodiment 2 the second exhaust valve 13 is made to display an exhaust function in the exhaust stroke during spark ignition combustion mode. The exhaust throttle 15 is closed only during the intake stroke during spark ignition combustion mode in order to make recirculation of the exhaust gas impossible during the intake stroke during spark ignition combustion mode, even when the second exhaust valve 13 is open.

According to the configuration described above, inner portion EGR can be performed only during compression ignition combustion mode by simple control in the cam engine while keeping costs low. Effects similar to those of Embodiment 1 can be obtained.

In addition, in Embodiment 2 the second exhaust valve 13 is also opened during the exhaust stroke, not only the first exhaust valve 12. Accordingly, exhaust can be performed by using two valves, the first exhaust valve 12 and the second exhaust valve 13. Exhaust of the exhaust gas can thus be performed with good efficiency.

Figure 4B:
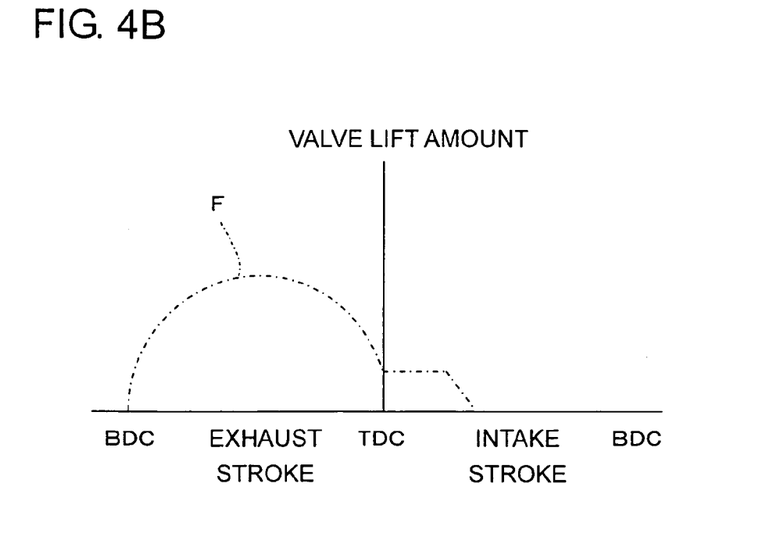
FIG. 4B is a diagram that shows valve opening and closing operations in a variation of Embodiment 2.

It should be noted that, although the second exhaust valve 13 is opened during the exhaust stroke and during the latter half of the intake stroke in Embodiment 2 described above, as a substitute the second exhaust valve 13 may also be opened as shown in FIG. 3A at the timing, and by the lift amount, denoted by reference symbol E during the exhaust stroke, and at the timing, and by the lift amount, denoted by reference symbol F during the intake stroke. In addition, the second exhaust valve 13 may also be opened at the timing, and by the lift amount, denoted by reference symbol F as shown in FIG. 4B. It should be noted that opening and closing operations of the second exhaust valve 13 are given preference in this explanation. Timings and lift amounts for the first exhaust valve 12 and the two intake valves 10 and 11 are thus omitted in FIGS. 4A and 4B.

Embodiment 3

Figure 5:
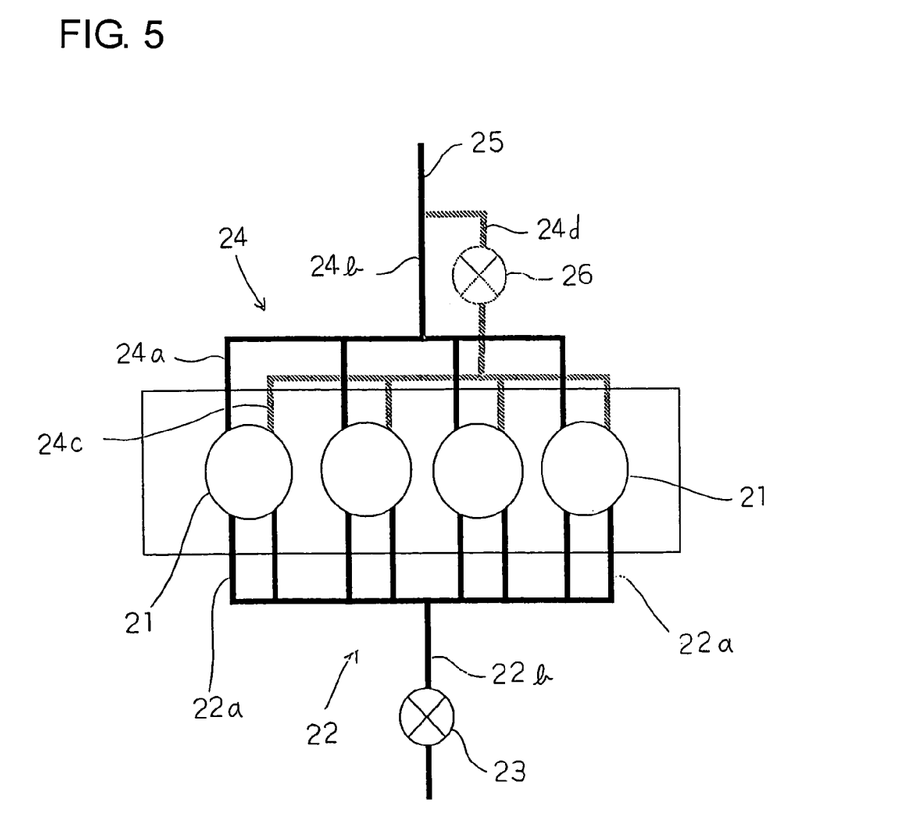
FIG. 5 is a diagram that schematically shows an intake/exhaust gas system in Embodiment 3.

Embodiment 3 of the present invention is explained next by using FIG. 5. A compression ignition engine of Embodiment 3 is one that is implemented by an embodiment in which only one exhaust throttle is provided as an exhaust system, while the exhaust throttle is provided in each of the combustion chambers in Embodiments 1 and 2 described above. Referring to FIG. 5, an intake passage 22 and an exhaust passage 24 are connected to each of four combustion chambers 21 in an in-line four cylinder compression ignition engine. The intake passages 22 comprise two intake branch passages 22a provided for the combustion chamber 21 of each cylinder, and an intake manifold passage 22b upstream of the intake branch passages 22a to which the total of eight intake branch passages 22a are joined. An intake throttle 23 is provided to the intake manifold passage 22b.

On the other hand, the exhaust passage 24 comprises four first exhaust branch passages 24a that correspond to the first exhaust branch passage 8a of FIG. 1, a first exhaust merging passage 24b where the four first exhaust branch passages 24a merge downstream, four second exhaust branch passages 24c that correspond to the second exhaust branch passage 8b of FIG. 1, a second exhaust merging passage 24d where the four second exhaust branch passages 24c merge downstream, and an exhaust manifold passage 25 downstream of the first exhaust merging passage 24b and the second exhaust merging passage 24d, to which the first exhaust merging passage 24b and the second exhaust merging passage 24d are joined. One exhaust throttle 26 is provided to the second exhaust merging passage 24d, common between each of the combustion chambers 21.

With the compression ignition engine of Embodiment 3, the two intake valves, the first exhaust valve, and the second exhaust valve that are formed in each of the combustion chambers 21 are controlled to open and close similarly to the operations used in Embodiments 1 and 2. Further, the exhaust throttle 26 also closes at least during a period in which the second exhaust valve is open during the intake stroke during spark ignition combustion mode, similar to Embodiments 1 and 2 that are described above. It therefore becomes possible to achieve effects that are similar to those described above even if an exhaust throttle is not provided for each of the combustion chambers 21.

Embodiment 4

Figure 6:
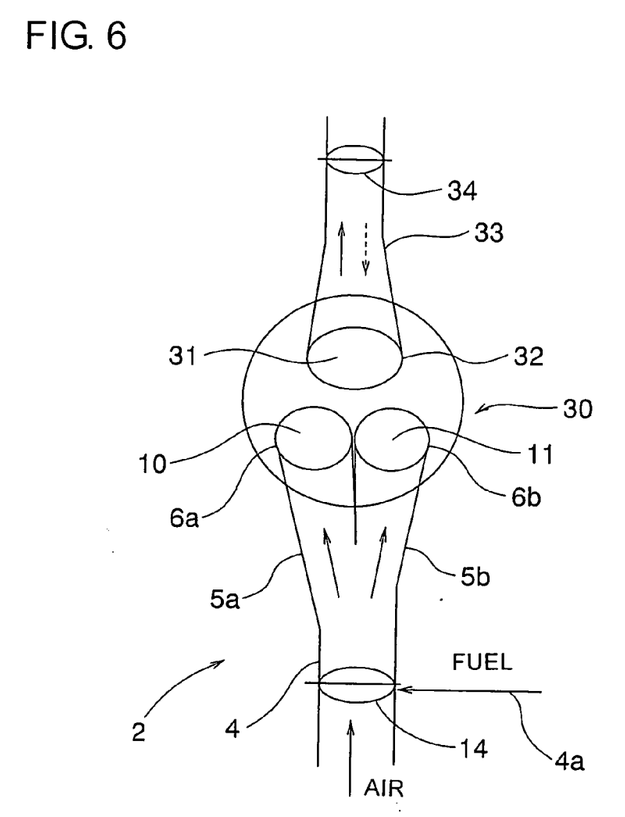
FIG. 6 is a plan view that schematically shows the vicinity of a combustion chamber in Embodiment 4.

Embodiment 4 of the present invention is explained next by using FIG. 6. A compression ignition engine of Embodiment 4 is one in which there is only one exhaust valve, not two, in the compression ignition engine of Embodiment 1 described above. One exhaust opening 32 is formed in a combustion chamber 30, and an exhaust valve 31 is disposed in the exhaust opening 32 as an exhausting means that is driven to open and close through use of a two stage cam. Further, the exhaust port 32 is connected to an exhaust passage 33, and the exhaust passage 33 has an exhaust throttle 34 midway along the exhaust passage 33. The exhaust throttle 34 is closed only for a period in which the exhaust valve 31 is open at least for the intake stroke during spark ignition combustion mode.

Figure 7:
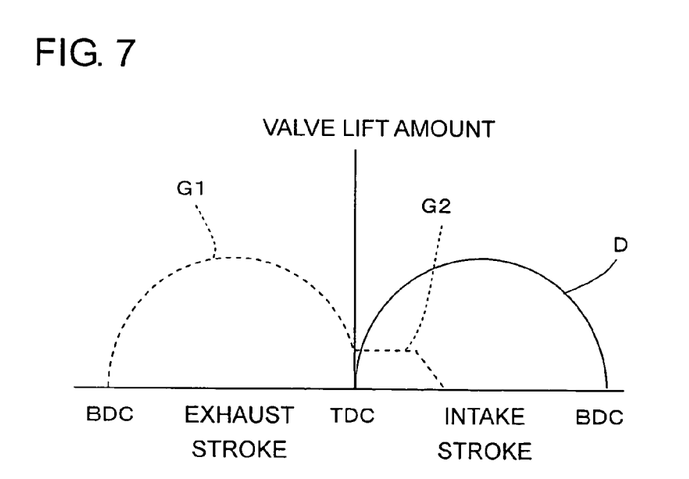
FIG. 7 is a diagram that shows valve opening and closing operations in Embodiment 4.

The exhaust valve 31 opens here at timings, and by lift amounts, denoted by reference symbols G1 and G2 in FIG. 7. That is, the exhaust valve 31, which is open during the exhaust stroke, does not completely close during the first half of the intake stroke but rather maintains a minute lift amount. Further, the two intake valves 10 and 11 are open at the timing, and by the lift amount, denoted by reference symbol D, similar to Embodiment 1. It should be noted that valve opening and closing control is performed the same way during compression ignition combustion mode and during spark ignition combustion mode.

The exhaust throttle 34 is open during the exhaust stroke during compression ignition combustion mode, while the exhaust throttle 34 maintains its open state during the intake stroke. The intake throttle 14 is also open by a suitable necessary amount. The exhaust valve 31 thus opens during the exhaust stroke, and the exhaust gas is exhausted to the exhaust passage 33. Further, the two exhaust valves 10 and 11 open during the intake stroke and new gas flows in. The exhaust valve 31 opens in the first half of the intake stroke, and high temperature exhaust gas recirculates into the combustion chamber 30 thus performing internal EGR.

Furthermore, during spark ignition combustion mode the exhaust throttle 34 is open during the exhaust stroke and the exhaust throttle 34 is closed during the intake stroke. The intake throttle 14, however, is opened by a suitable amount when necessary. Therefore the exhaust valve 31 opens and the exhaust gas is exhausted to the exhaust passage 33 during the exhaust stroke, and further, the two intake valves 10 and 11 open and new gas flows in during the intake stroke, but the exhaust throttle 34 is closed at this point. Accordingly, the high temperature exhaust gas is prevented from recirculating into the combustion chamber 30 even if the exhaust valve 31 is opened during the first half of the intake stroke.

Internal EGR can therefore be performed only during compression ignition combustion mode by simple control in a cam engine with this configuration, while suppressing costs. Effects that are similar to those of Embodiment 1 can be obtained.

It should be noted that the exhaust throttle is preferably disposed in a location that is as close to the exhaust valve as possible. The amount of recirculation by exhaust gas remaining between the exhaust valve and the exhaust throttle can thus be decreased.

It should be noted that, as a substitute for the exhaust valve 31 opening in the first half of the intake stroke in Embodiment 4, maintaining a minute lift amount, the exhaust valve 31 may also completely close after completion of the exhaust stroke, and then open once again somewhere during the intake stroke, such as during the latter half of the intake stroke.

Further, one of the exhaust throttles that are provided to each of the combustion chambers may also be provided as an exhaust system in Embodiment 4, similar to Embodiment 3.

In addition, two of the exhaust valve that opens during both the exhaust stroke and the intake stroke may be provided to each of the combustion chambers by utilizing a two stage cam.

Furthermore, although all of the exhaust branch passages merge into the one exhaust merging passage in Embodiment 4, and the one exhaust throttle is provided to the one exhaust merging passage, there are no limitations placed on this structure. For example, a plurality of exhaust branch passages may also merge into two exhaust merging passages, and one exhaust throttle may be disposed in each of the exhaust merging passages in a Vee engine. That is, a total of two exhaust throttles may be provided. The number of exhaust throttles can be reduced provided that at least two exhaust branch passages merge into one exhaust merging passage, and one exhaust throttle is disposed in the exhaust merging passage.

Embodiment 5

Figure 8:
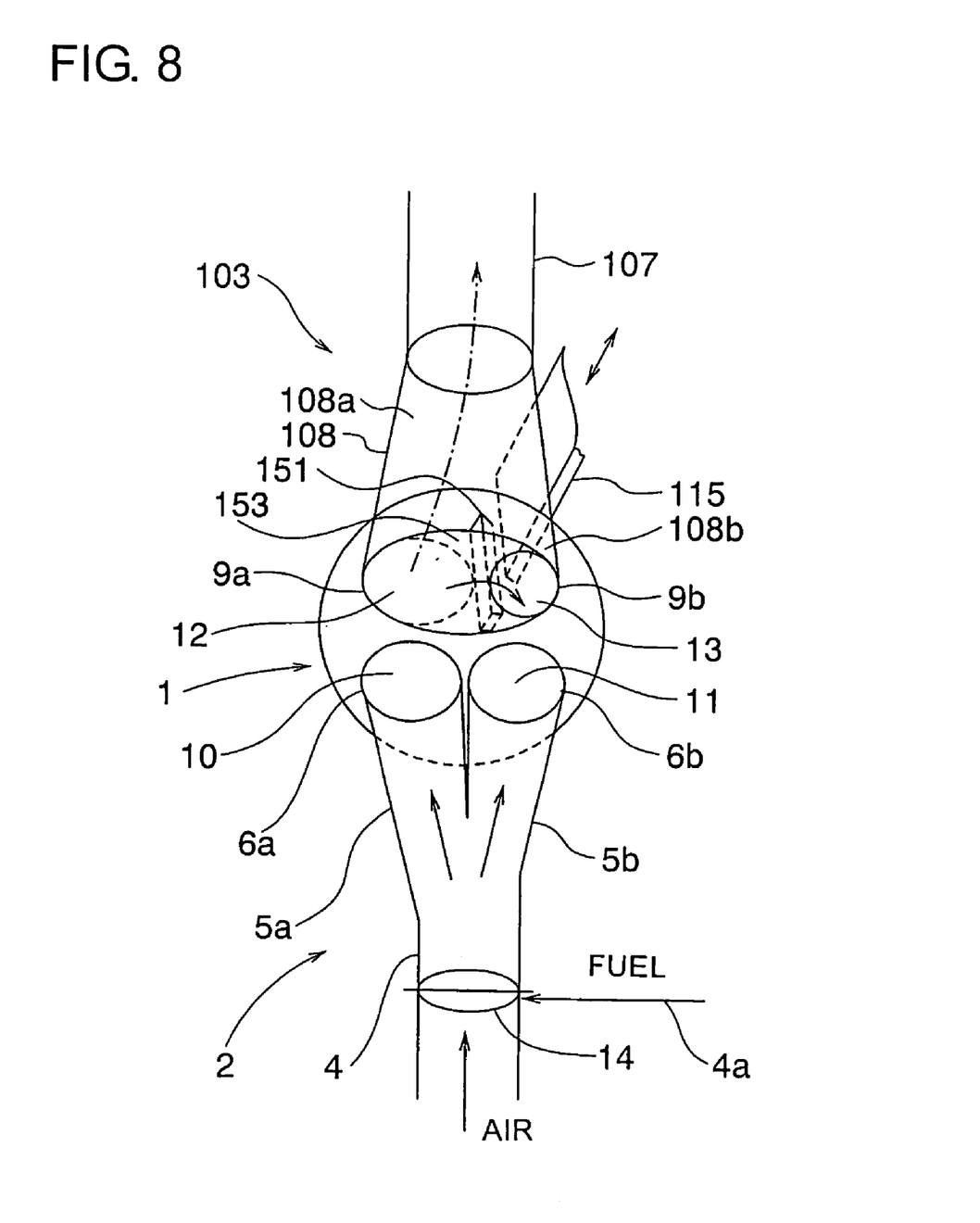
FIG. 8 is a plan view that schematically shows the vicinity of a combustion chamber in Embodiment 5.

Embodiment 5 is explained next based on FIG. 8. It should be noted that FIG. 8 shows three-dimensionally only exhaust passage portions corresponding to embodiment of FIG. 1 that will help to increase understanding. A compression ignition engine according to this embodiment differs from that of Embodiment 1 explained above in the structure of an exhaust passage and an exhaust gas recirculation preventing means. Other portions have structures that are similar to those of Embodiment 1. The first exhaust opening 9a and the second exhaust opening 9b are formed on an upper portion of the combustion chamber 1, similar to Embodiment 1. The first exhaust opening 9a and the second exhaust opening 9b are connected to an exhaust passage 103. The exhaust passage 103 comprises a single tubular communication chamber 108 that is connected to the first exhaust opening 9a and to the second exhaust opening 9b so as to include both of the exhaust openings, and an exhaust main passage 107 that is provided downstream of the communication chamber 108. A low height partition 151 is arranged in a standing condition within the communication chamber 108. The partition 151 stands up from a portion between the exhaust opening 9a and the exhaust opening 9b in a bottom wall portion 153 that is a wall portion in which the first exhaust opening 9a and the second exhaust opening 9b are formed, and that is a bottom surface of the communication chamber 108. Further, a shutter valve 115 is provided to the communication chamber 108. The shutter valve 115 is slidably provided contacting with, or separated from, the partition 151. For cases where the shutter valve 115 is in a closed state, that is for cases where the shutter valve 115 contacts the partition 151, the inside of the communication chamber 108 is divided into a first exhaust chamber 108a and a second exhaust chamber 108b that can communicate only through the combustion chamber 1. That is, the inside of the communication chamber 108 is divided by the shutter valve 115 so that the first exhaust opening 9a and the second exhaust opening 9b do not mutually communicate with each other. With the shutter valve 115 in a closed state, the first exhaust chamber 108a becomes a chamber that communicates with the exhaust main passage 107, and the second exhaust chamber 108b becomes a chamber that is separated from the exhaust main passage 107.

Operation of a compression ignition engine having this type of configuration is explained next. An opening and closing timing for the shutter valve 115 is similar to that of the exhaust throttle 15 of Embodiment 1 explained above. Further, an opening and closing timing for the first exhaust valve 12 and for the second exhaust valve 13 is similar to that of Embodiment 1. The first exhaust valve 12 therefore opens and the second exhaust valve 13 therefore closes in the exhaust stroke during compression ignition combustion mode and the shutter valve 115 opens. The exhaust gas from the combustion chamber 1 is thus exhausted through the first exhaust opening 9a, the communication chamber 108, and the exhaust main passage 107 as shown by a dashed line in FIG. 8. On the other hand, the first exhaust valve 12 closes, the second exhaust valve 13 opens, and the shutter valve 115 opens in the intake stroke during compression ignition combustion mode. The exhaust gas that is exhausted to the communication chamber 108 during the exhaust stroke and that exists in the vicinity of the first exhaust opening 9a thus recirculates from the second exhaust opening 9b to the inside of the combustion chamber 1 through a space between the shutter valve 115 and the partition 151, as shown by a solid line in FIG. 8.

Further, opening and closing control of the first exhaust valve 12 and the second exhaust valve 13 similar to that performed during compression ignition combustion mode is also performed during spark ignition combustion mode. However, the shutter valve 115 always maintains a closed state during spark ignition combustion mode. The exhaust gas that is exhausted to the communication chamber 108 during the exhaust stroke is therefore prevented from recirculating to the inside of the combustion chamber 1 from the open second exhaust opening 9b. Actions and effects that are similar to those of Embodiment 1 can thus also be obtained in Embodiment 5.

In addition, recirculation of the exhaust gas during compression ignition combustion mode does not go beyond a simple intake of the exhaust gas, which exists within the communication chamber 108 after being exhausted during the exhaust stroke, into the combustion chamber 1 through the second exhaust opening 9b. Accordingly, recirculation of the exhaust gas can be performed by an embodiment having a very short distance, and little passage resistance, compared to going around a fork portion between the first exhaust branch passage 8a and the second exhaust branch passage 8b as in Embodiment 1. EGR having very good efficiency can thus be achieved.

It should be noted that alterations similar to those available for Embodiment 1 can also be made in Embodiment 5. That is, the shutter valve 115 may also be closed only during the intake stroke during spark ignition combustion mode. Alternatively, the shutter valve 115 may also maintain a state in which it is always closed only for a period at least during which the second exhaust valve 13 is open.

Furthermore, setting operations of the second exhaust valve 13 to be like those shown in FIG. 3A or FIG. 3B, and altering the relationship between the radii of the second exhaust opening 9b and the first exhaust opening 9a are also similar to the settings and alterations of Embodiment 1.

Figure 9:
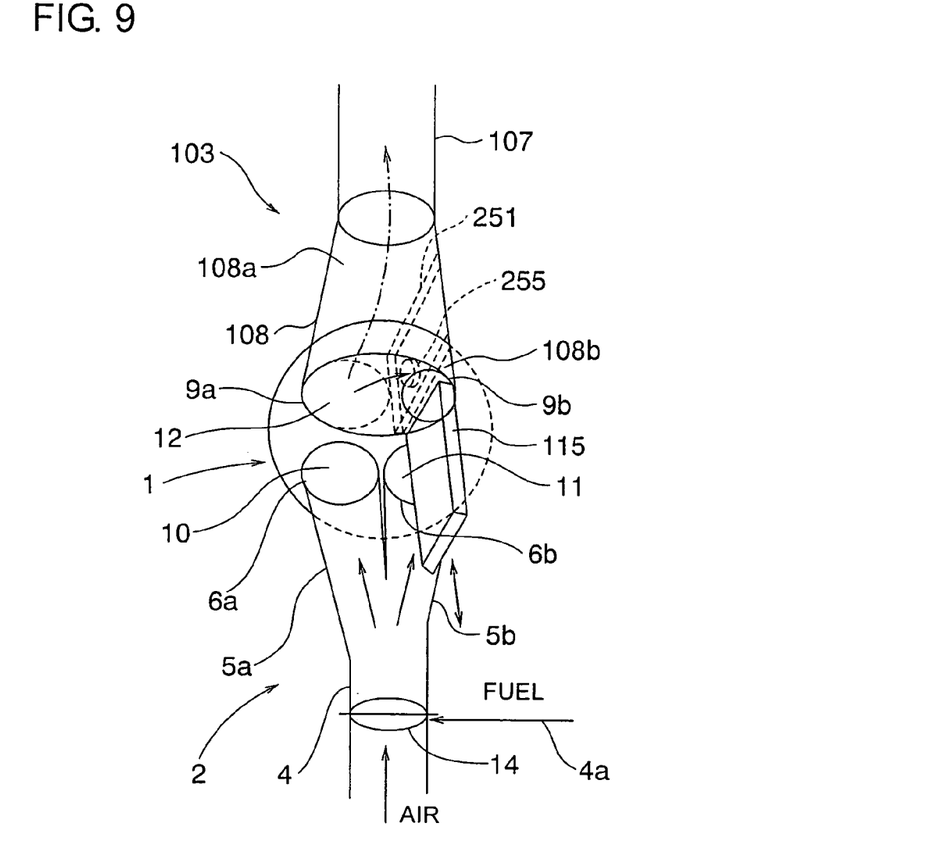
FIG. 9 is a plan view that schematically shows the vicinity of a combustion chamber in a variation of Embodiment 5.

Further, an embodiment in which the inside of the communication chamber 108 is divided by the shutter valve 115 can also be used. Referring to FIG. 9, a simple partition 251 capable of dividing the inside of the communication chamber 108 into a first exhaust chamber 108a and a second exhaust chamber 108b is provided within the liking chamber 108. The partition 251 extends from between the first exhaust opening 9a and the second exhaust opening 9b, and a peripheral edge of the partition 251 is connected to the bottom surface and a side surface of the communication chamber 108. Further, a communication opening 255 is formed completely passing through a lower portion of the partition 251. That is, the communication opening 255 is formed in a portion in the vicinity of the first exhaust opening 9a and the second exhaust opening 9b. In addition, the shutter valve 115 is provided to the communication chamber 108 so that the communication opening 255 can be selectively opened and closed. Exhaust gas recirculation can also be performed through the communication opening 255 during the intake stroke during compression ignition combustion mode with this configuration, and actions that are similar to the configuration of FIG. 8 can also be obtained.

It should be noted that the present invention is not limited to Embodiments 1 to 5 that are described above. A variety of alteration can also be made. For example, the intake throttle used in Embodiments 1 to 4 can also use a shutter valve like that shown in Embodiment 5 or the like in addition to a butterfly shape valve. Further, the amount of the exhaust gas that is recirculated may also be adjusted by changing the opening of the exhaust throttle or the shutter when necessary.

Furthermore, the timing for switching between compression ignition combustion mode and spark ignition combustion mode is not limited to being based on the engine load. In addition, although embodiments in which switching between premixed compression ignition combustion mode and spark ignition combustion mode are explained in Embodiments 1 to 5, the present invention is not limited to these embodiments. It is also possible to apply the present invention to embodiments in which there is switching between simple, non-premixed compression ignition combustion mode (an ignition type where fuel within a gas that is compressed by a piston is directly injected from a fuel injection valve that is disposed within the combustion chamber) and spark ignition combustion mode.

In addition, although natural gas is used as fuel in Embodiments 1 to 5, as a substitute, gas fuels such as town gas and propane gas can also be used, as is. Further, the compression ignition internal combustion engine of the present invention may also be implemented by using gasoline, diesel fuel, or the like. In addition, the number of engine cylinders is not limited to four. Six cylinders or eight cylinders may also be used, and the engine type need not be in-line. A Vee type, a horizontally opposed type, and the like may also be used. No particular limitations are placed on the engine type. Furthermore, the number of intake passages and the number of intake valves for each cylinder are also not limited to those in Embodiments 1 to

What is claimed is:

1. A compression ignition internal combustion engine that performs switching between compression ignition combustion mode and spark ignition combustion mode, the compression ignition internal combustion engine comprising:
   at least one combustion chamber;
   an intake passage and an exhaust passage connected to the combustion chamber, respectively;
   intake means provided at a position along the intake passage for opening and closing the intake passage;
   exhaust means provided at a position along the exhaust passage, and is driven by a cam, for opening and closing the exhaust passage, the exhaust means opening the exhaust passage for a period of at least a portion of an exhaust stroke, and for a period of at least a portion of an intake stroke, during the compression ignition combustion mode and during the spark ignition combustion mode; and
   exhaust gas recirculation preventing means provided at a position along the exhaust passage, for opening and closing the exhaust passage, the exhaust gas recirculation preventing means recirculating exhaust gas to the combustion chamber by opening the exhaust passage at least during the intake stroke during the compression ignition combustion mode, the exhaust gas recirculation preventing means preventing the recirculation of the exhaust gas to the combustion chamber by closing the exhaust passage for a period at least when the exhaust means is open in the intake stroke during the spark ignition combustion mode.

2. A compression ignition internal combustion engine according to claim 1, wherein:
   the exhaust passage comprises a first exhaust branch passage and a second exhaust branch passage connected to the combustion chamber, respectively, and a merging passage where the first exhaust branch passage and the second exhaust branch passage merge;
   the exhaust means comprising a first exhaust valve provided to the first exhaust branch passage for only opening during the exhaust stroke, and a second exhaust valve provided to the second exhaust branch passage for only opening during the intake stroke; and
   the exhaust gas recirculation preventing means is an exhaust throttle provided to the second exhaust branch passage, the exhaust throttle closing the second exhaust branch passage for a period during which at least the second exhaust valve is open in the exhaust stroke during the spark ignition combustion mode, the exhaust throttle always opening the second exhaust branch passage during the compression ignition combustion mode.

3. A compression ignition internal combustion engine according to claim 2, wherein the first exhaust branch passage and the second exhaust branch passage are linked to the combustion chamber through a first exhaust opening and a second exhaust opening, respectively, the second exhaust opening having a smaller diameter than a diameter of the first exhaust opening.

4. A compression ignition internal combustion engine according to claim 2, wherein the exhaust throttle closes the second exhaust branch passage at least during the intake stroke during the spark ignition combustion mode.

5. A compression ignition internal combustion engine according to claim 4, wherein the exhaust throttle always closes the second exhaust branch passage during the spark ignition combustion mode.

6. A compression ignition internal combustion engine according to claim 2, wherein the second exhaust valve opens during a period of a portion of the intake stroke and during the exhaust stroke.

7. A compression ignition internal combustion engine according to claim 1, wherein:
   the exhaust means comprises a simple exhaust valve that opens during a period of at least a portion of the intake stroke and during the exhaust stroke; and
   the exhaust gas recirculation preventing means being an exhaust throttle opening the exhaust passage during the exhaust stroke and closing the exhaust passage for a period at least during which the exhaust valve is open in the intake stroke during the spark ignition combustion mode.

8. A compression ignition internal combustion engine according to claim 1, further comprising a plurality of the combustion chambers,
   the exhaust passage comprising a plurality of exhaust branch passages connected to the plurality of combustion chambers, respectively, and an exhaust merging passage where the exhaust branch passages merge together;
   the exhaust means comprising a plurality of exhaust valves provided corresponding to the plurality of exhaust branch passages, respectively, each of the plurality of exhaust valves opening the exhaust branch passage to which each of the plurality of exhaust valves is connected at least during the intake stroke of the combustion chamber connected to the exhaust branch passage; and
   the exhaust gas recirculation preventing means being an exhaust throttle provided to the exhaust merging passage for closing the exhaust merging passage at least during a period when each of the plurality of exhaust valves opens in the intake stroke during the spark ignition combustion mode.

9. A compression ignition internal combustion engine according to claim 1, wherein:
the combustion chamber and the exhaust passage are communicated with each other through a first exhaust opening and a second exhaust opening;
the exhaust passage comprising a simple tubular communication chamber at an upstream end portion of the exhaust passage, the tubular communication chamber being connected to the first exhaust opening and the second exhaust opening so as to include both the first exhaust opening and the second exhaust opening;
the exhaust means comprising a first exhaust valve that opens the first exhaust opening only during the exhaust stroke during the compression ignition combustion mode and the during spark ignition combustion mode, and a second exhaust valve that opens the second exhaust opening during at least the intake stroke during the compression ignition combustion mode and during the spark ignition combustion mode;
the exhaust gas recirculation preventing means comprising a shutter valve that divides an inside of the tubular communication chamber so that the first exhaust opening and the second exhaust opening do not communicate with each other when the shutter valve is closed, the shutter valve opening so that the first exhaust opening and the second exhaust opening are in a mutually communicating state at least during the intake stroke during the compression ignition combustion mode.

10. A compression ignition internal combustion engine according to claim 9, further comprising a partition disposed between the first exhaust opening and the second exhaust opening, the shutter valve being slidably provided so as to contact with and separate from the partition.

11. A compression ignition internal combustion engine according to claim 9, further comprising a partition between the first exhaust opening and the second exhaust opening, the partition dividing the inside of the tubular communication chamber and having a communication opening formed passing therethrough, the shutter valve being slidably provided so that the shutter valve opens and closes the communication opening of the partition.

12. A compression ignition internal combustion engine according to claim 1, further comprising intake controlling means that restricts an inflow of new gas to the combustion chamber, recirculation of exhaust gas from the exhaust means being increased by using the intake controlling means to restrict an amount of new gas that flows in during the intake stroke during the compression ignition combustion mode.

13. A compression ignition internal combustion engine according to claim 1, wherein the intake means is driven by the cam to perform opening and closing of the intake passage.

14. A compression ignition internal combustion engine according to claim 1, wherein:
the intake passage comprises an intake merging passage, and two intake branch passages that branch at a distal end of the intake merging passage and that are each connected to the combustion chamber;
the intake means comprising two intake valves that are provided to the intake branch passages, respectively.

* * * * *

UNITED STATES PATENT AND TRADEMARK OFFICE
CERTIFICATE OF CORRECTION

| | |
|---|---|
| PATENT NO. | : 6,932,062 B2 |
| DATED | : August 23, 2005 |
| INVENTOR(S) | : Kuzuyama et al. |

It is certified that error appears in the above-identified patent and that said Letters Patent is hereby corrected as shown below:

Column 13,
Line 18, please delete "mode and the during" and insert therefore -- mode and during the --.

Signed and Sealed this

Sixth Day of December, 2005

JON W. DUDAS
*Director of the United States Patent and Trademark Office*